April 14, 1959     A. L. HAYNES ET AL     2,881,706
MOTOR VEHICLE HYDRAULIC SYSTEM
Filed May 18, 1955

A.L. HAYNES
A.M. KURZ
W.A. VAN WICKLIN, JR
INVENTORS

ATTORNEYS

April 14, 1959 A. L. HAYNES ET AL 2,881,706
MOTOR VEHICLE HYDRAULIC SYSTEM
Filed May 18, 1955 4 Sheets-Sheet 2

A.L.HAYNES
A.M.KURZ
W.A.VAN WICKLIN
INVENTORS

BY

ATTORNEYS

April 14, 1959

A. L. HAYNES ET AL 2,881,706

MOTOR VEHICLE HYDRAULIC SYSTEM

Filed May 18, 1955

A.L. HAYNES
A.M. KURZ
W.A. VAN WICKLIN, JR.
INVENTORS

BY E.C. McRae
J.R. Faulkner
D.H. Oster

ATTORNEYS

April 14, 1959     A. L. HAYNES ET AL     2,881,706
MOTOR VEHICLE HYDRAULIC SYSTEM
Filed May 18, 1955     4 Sheets-Sheet 4

A.L. HAYNES
A.M. KURZ
W.A. VAN WICKLIN, JR.
INVENTORS

ATTORNEYS

United States Patent Office 2,881,706
Patented Apr. 14, 1959

2,881,706
MOTOR VEHICLE HYDRAULIC SYSTEM

Alex L. Haynes and Alvin M. Kurz, Detroit, and Warren A. Van Wicklin, Jr., Dearborn, Mich., assignors to Ford Motor Company, Dearborn, Mich., a corporation of Delaware Application May 18, 1955, Serial No. 509,144

4 Claims. (Cl. 103—51)

This invention relates generally to motor vehicle hydraulic systems, and particularly to a coordinated hydraulic system for operating a plurality of hydraulically actuated vehicle components.

One of the present trends in motor vehicle development is the use of an ever increasing number of power operated vehicle components. Many of these components are or can be hydraulically power actuated, such as steering devices, brakes, windshield wipers, seat adjusters, window lifts, convertible tops, door locks, deck lids, and others. Although such power devices can be provided with their own separate power systems, it is an object of the present system to provide a unitary system utilizing a single source of fluid pressure in combination with an hydraulic intensifier to increase the pressure to the amount required for operation of the hydraulically actuated devices, and to supply the high pressure fluid through a common supply conduit to the various power units. Although a separate pump may be provided, the conventional front pump of the vehicle automatic transmission may be used as the fluid source for the system. To convert the relatively low pressure supplied by the transmission pump to a higher pressure suitable for actuation of the various hydraulically actuated components, an automatic hydraulic intensifier is provided. A hydraulic accumulator is also provided in the system, connected to the outlet of the intensifier and to the common supply conduit to the hydraulically actuated components, to provide an instantly available quantity of fluid under high pressure to accommodate the operation of the hydraulically actuated components either singly or simultaneously.

Other objects and advantages of this invention will be made more apparent as this description proceeds, particularly when considered in connection with the accompanying drawings, wherein.

Figures 2, 4:
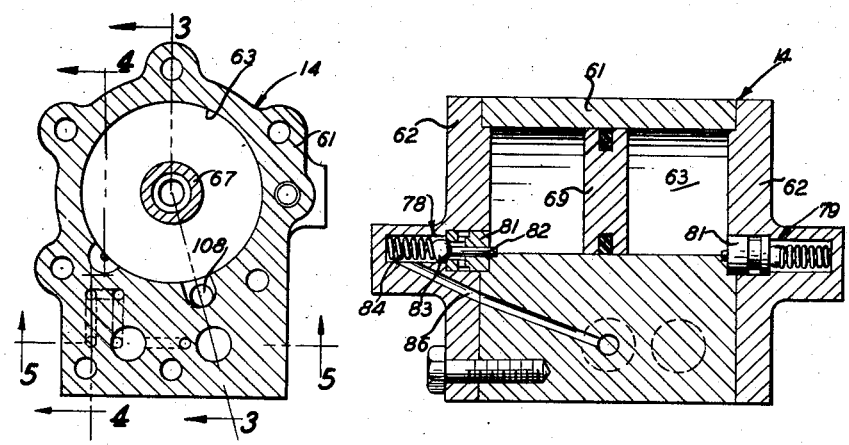
Figure 2 is an enlarged vertical cross sectional view of the hydraulic intensifier, taken on the line 2—2 of Figure 1.
Figure 3:
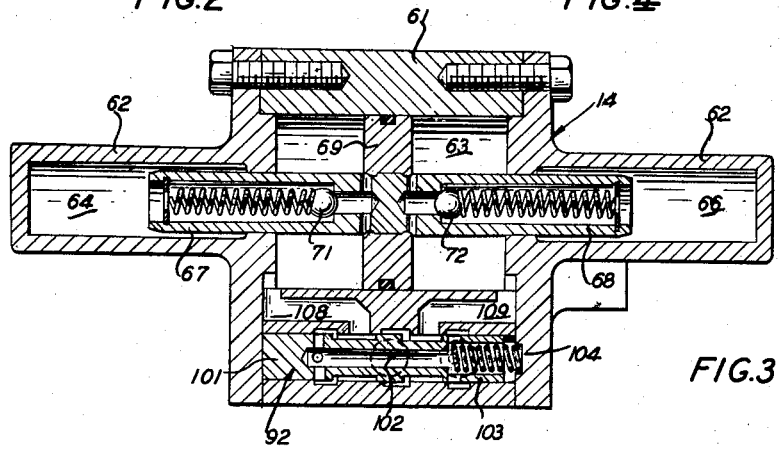
Figure 5:
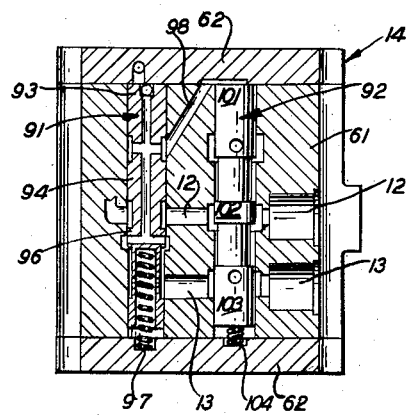

Figures 3, 4, and 5 are cross sectional views taken on the lines 3—3, 4—4 and 5—5 of Figure 2.

Figure 6:
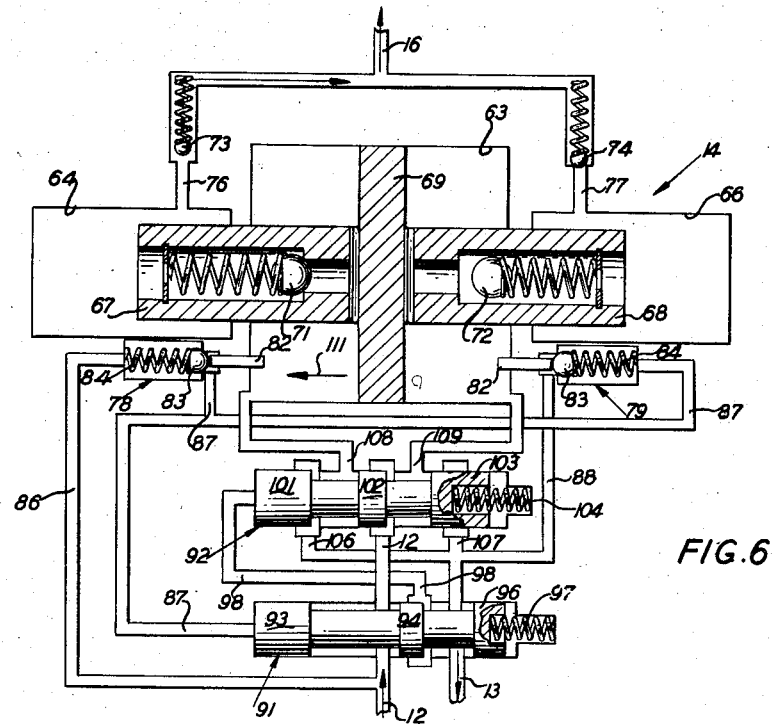

Figure 6 is a semidiagrammatical view of the intensifier shown in Figures 2-5 with the piston thereof shown in a central position and moving to the left.

Figure 7:
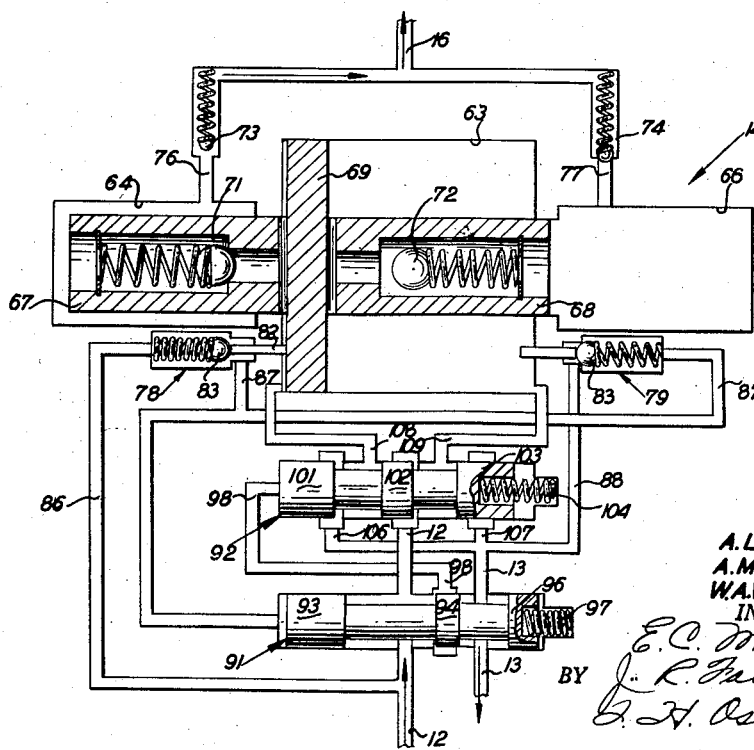

Figure 7 is a view similar to Figure 6 but showing a piston at the completion of its leftward stroke.

Figure 1:
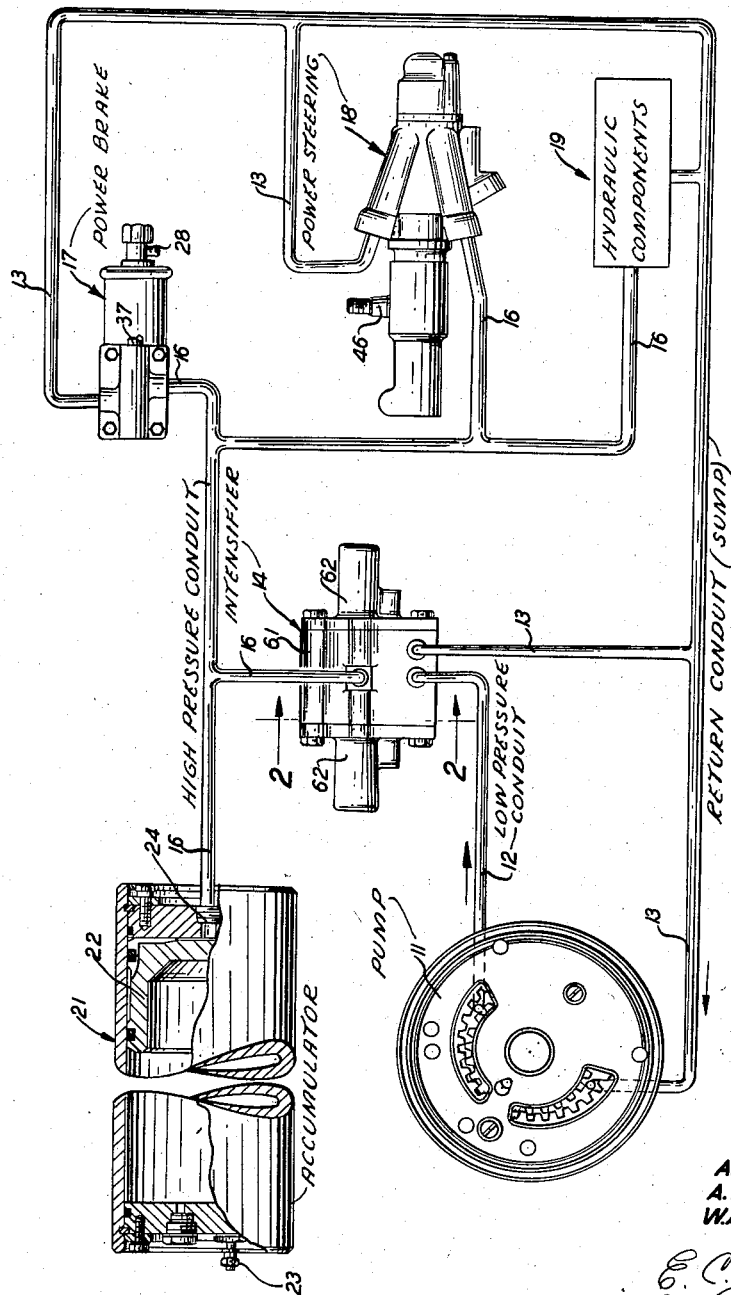
Figure 1 is a semidiagrammatic view, partly in section, of a motor vehicle hydraulic system incorporating the present invention.
Figure 8:
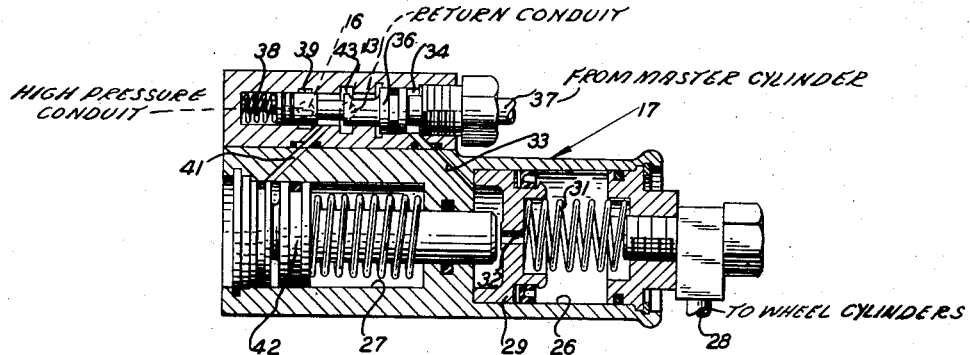

Figure 8 is an enlarged cross sectional view of the power brake mechanism shown in Figure 1.

Figure 9:
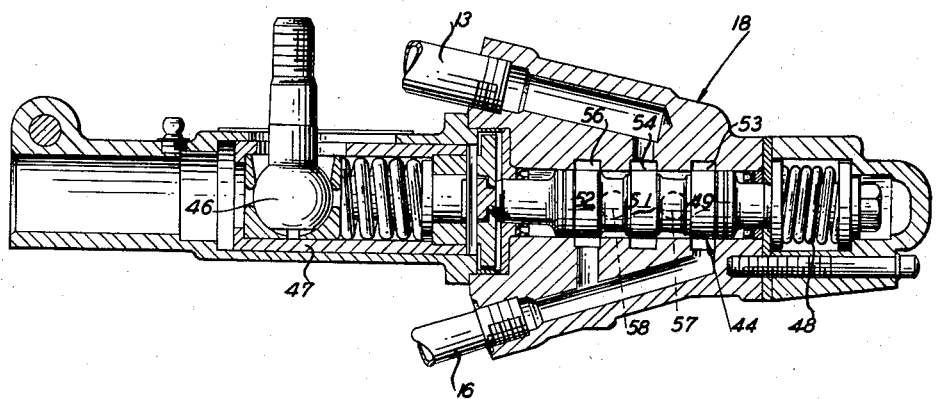

Figure 9 is an enlarged cross sectional view of the power steering valve shown in Figure 1.

Referring now to the drawings, and particularly to Figure 1, the reference character 11 indicates generally a conventional hydraulic pump. This pump may be the pump incorporated in the automatic transmission of the motor vehicle, or it may be a separate pump suitably driven from the vehicle engine. The pump has a pressure supply conduit 12 and a return conduit 13.

Since the front transmission pump is operated at all times when the motor vehicle engine is running, it forms a convenient source of pressure without the necessity of providing additional and separate hydraulic pumps for the various vehicle components to be hydraulically actuated. The pressure supplied by such a pump, however, is relatively low, being in the order of, for example, 100 p.s.i. Since a considerably higher pressure is desired for the operation of such components as power steering and power brakes, the system incorporates a hydraulic intensifier 14. The intensifier 14 is connected to the pressure supply conduit 12 from the pump, and has a high pressure conduit 16 connected to the various hydraulically actuated components. It also has a connection to the return conduit 13.

The high pressure conduit 16 is connected to power brake mechanism 17, power steering mechanism 18, and if desired to other hydraulically actuated vehicle components indicated diagrammatically at 19.

Also connected to the high pressure conduit 16 is an accumulator 21. The accumulator 21 is in the form of a cylinder having a piston 22 reciprocable therein. The accumulator is precharged with air through an air valve 23 to, for example, 300 p.s.i., and it will be apparent that the introduction of high pressure fluid from the conduit 16 to the interior of the accumulator 21 through the inlet 24 moves the piston 22 to the left until the air pressure is built up to an amount equaling the fluid pressure. The accumulator thus provides an immediately available quantity of fluid under high pressure to satisfy the initial requirements of the power brake mechanism 17, power steering mechanism 18, or other components 19, even though a plurality of these components may be operated simultaneously. The accumulator also provides a safety factor since it furnishes fluid under pressure for limited operation of the various components in the event of failure of the fluid pressure source.

Referring now to Figure 8, the power brake mechanism is contained within a housing formed with aligned cylinders 26 and 27. The cylinder 26 is connected to an outlet conduit 28 leading to the hydraulic wheel cylinders for the vehicle wheel brakes. A piston 29 is reciprocable within the cylinder 26 against the action of the return spring 31, and is provided with a central aperture 32 therethrough. Rearwardly of the piston 29 the cylinder 26 is connected by a passageway 33 to a chamber 34 at one end of a valve spool 36. Chamber 34 is also connected by a conduit 37 to the conventional hydraulic master cylinder of the motor vehicle brake system.

Manual operation of the master cylinder forces fluid under pressure into the chamber 34 and through the passageway 33 and piston aperture 32 to the outlet conduit 28 leading to the wheel cylinders. In addition, the fluid pressure in chamber 34 moves the spool valve 36 to the left in Figure 8 against the action of coil spring 38. Movement of valve 36 to the left uncovers annular groove 39 which communicates with the high pressure conduit 16, and supplies high pressure fluid through passageway 41 to cylinder 27 rearwardly of the power piston 42 reciprocably mounted therein. The piston 42 is accordingly moved under high pressure to the right, closing passageway 32 in the piston 29 and thereafter moving the piston 29 under power assistance to apply the brakes. During the return stroke of the power piston 42 the fluid back of the piston is returned through passageway 41 and chamber 43 to the return conduit 13. It will be noted that the power brake mechanism 17 is a closed system requiring no fluid except when a power assist is called for.

Figure 9 illustrates the control valve of the power steering mechanism 18 incorporating a valve spool 44 adapted to be moved either to the right or to the left in response to manual steering effort applied through the pitman arm ball 46 and the reciprocable sleeve 47 connected to the ball. The valve spool 44 is centered by the centering spring 48, and in this position the three lands 49, 51 and 52 of the valve spool completely cover pressure port 53, return port 54 and pressure port 56 respectively. The pressure ports 53 and 56 are supplied with high pressure fluid from the high pressure conduit 16, while the return port 54 communicates with the return conduit 13. In the neutral position of the valve, as shown in Figure 9, the pressure ports 53 and 56 are blocked and no fluid is drawn from the system. The valving is thus of the closed center type.

Ports 57 and 58 communicate with the opposite ends of a power cylinder (not shown), conventional in construction and conventionally connected to the steering mechanism of the vehicle to provide a power assist. It will be apparent that movement of the spool valve 44 from the position shown in Figure 9 in either direction connects one of the conduits 57 and 58 to pressure port 53 or 56, while the other cylinder conduit is connected to the return port 54.

The other hydraulically actuated components of the vehicle, indicated generally by the reference character 19 of Figure 1, are likewise of the closed type, using no fluid except when operated.

With reference now particularly to Figures 2 to 5 inclusive, and to the diagrammatic views of Figures 6 and 7, the hydraulic intensifier 14 has a central housing 61 and a pair of end housings 62 suitably bolted together. A low pressure cylinder 63 is formed in the central housing 61, and smaller diameter high pressure cylinders 64 and 66 are formed in the end housings 62. Integrally formed high pressure pistons 67 and 68 reciprocate in the high pressure cylinders, and centrally support a large diameter low pressure piston 69 reciprocating within the low pressure cylinder 63. Spring urged check valves 71 and 72 control axial bores in the high pressure pistons 67 and 68 respectively, and check valves 73 and 74 control outlet conduits 76 and 77 leading respectively from the high pressure cylinders 64 and 66 respectively to the high pressure conduit 16 supplying high pressure fluid to the various hydraulically actuated vehicle components.

Pilot valves 78 and 79 are provided at opposite ends of the large diameter low pressure cylinder 63. Each pilot valve comprises a bushing 81 carried by the end housing 62 and slidably receiving a pilot pin 82. The pin 82 is adapted to be engaged by the low pressure piston 69 when it reaches the end of its stroke to unseat the ball 83 against the action of coil spring 84. In the case of the left-hand pilot valve 78, as seen in Figure 6, the unseating of ball 83 establishes communication between conduit 86, communicating with the low pressure supply conduit 12 from the pump, and conduit 87. The right-hand pilot valve 79, on the other hand, when opened establishes communication between conduit 87 and a conduit 88 communicating with the return conduit 13 returning fluid to the sump of the pump 11.

The control system for the hydraulic intensifier 14 is completed by a three-way actuating valve 91 and a four-way control valve 92. The actuating valve 91 has spaced lands 93, 94, and 96, and the valve is constantly urged to the left by means of a spring 97. The actuating valve 91 communicates at axially spaced points with the low pressure supply conduit 12, a control conduit 98, and the return conduit 13.

The control valve 92 likewise has spaced lands 101, 102 and 103, and is urged to the left by means of a coil spring 104. The bore of the control valve 92 communicates at spaced points with the low pressure supply conduit 12 and branches 106 and 107 of the return conduit 13, and also communicates through conduits 108 and 109 to the opposite ends of the large diameter low pressure cylinder 63 on the opposite sides of the piston 69.

It will be noted that the conduit 87 from the pilot valves 78 and 79 communicates with the left-hand end of the actuating valve 91, and that the control conduit 98 from actuating valve 91 communicates with the left-hand end of the control valve 92.

The operation of the intensifier will now be described. In Figure 6 the pistons 67, 68 and 69 are shown in their central position, during a leftward stroke as indicated by the arrow 111. At this time, low pressure fluid from the low pressure conduit 12 is supplied through conduit 86 to the left-hand end of pilot valve 78 and is also supplied to the right-hand end of the low pressure cylinder 63 past the central land 102 of the control valve 92 and through the conduit 109. The resulting movement of the piston assembly to the left results in the generation of high pressure fluid within the left-hand high pressure cylinder 64 by reason of the differential area between the pistons 67 and 69. This high pressure fluid opens check valve 73 and supplies fluid to the high pressure conduit 16 for transmittal to the accumulator 21 and the various hydraulically actuated components. During this portion of the stroke, the check valve 72 carried by the high pressure piston 68 is opened to fill the high pressure cylinder 66 as the piston 68 is withdrawn therefrom.

When the piston assembly reaches the left-hand end of its stroke the large diameter piston 69 will engage the pilot pin 82 for the left-hand pilot valve 78, unseating valve 83 against the action of coil spring 84. This opens pilot valve 78 to permit low pressure fluid from conduit 86 to communicate through conduit 87 to the left-hand end of the actuating valve 91 and also to the right-hand end of the right-hand pilot valve 79. The pressure upon the left-hand end of actuating valve 91 overcomes coil spring 97 and moves the actuating valve to the right. This movement causes intermediate land 94 to close communication between control conduit 98 and return conduit 13 and to simultaneously open communication between the low pressure supply conduit 12 and control conduit 98. This supplies low pressure fluid to the left-hand end of control valve 92, moving this valve to the right until its movement is stopped by engagement of the right-hand end of the valve with the end of its bore. Thus, although the movement of the actuating valve 91 is only sufficient to create a small opening between the supply conduit 12 and the control conduit 98, the control valve 92 moves its entire stroke to establish a full fluid flow therethrough. This movement connects the left-hand end of the low pressure cylinder 63 to low pressure fluid from the supply conduit 12 past land 102 and through conduit 108, and at the same time connects the right-hand end of the cylinder to the return conduit through conduit 109 and branch return conduit 107. The movement of the piston assembly is thus automatically reversed at the end of its stroke and the piston then moves to the right in the direction opposite to arrow 111.

This movement of the piston assembly continues until the large diameter piston 69 engages the pilot pin 82 of the right-hand pilot valve 79, to unseat its ball 83. The unseating of ball 83 establishes communication between conduits 87 and 88, and since 88 is a branch conduit of the return conduit 13, this connects conduit 87 to the sump to relieve the fluid pressure trapped in conduit 87 when the piston 69 commenced its rightward movement and released the pilot pin 82 of the left-hand pilot valve 78 to allow the ball 83 to be seated by the coil spring 84. Dropping the pressure in conduit 87 lowers the pressure in the left-hand end of the actuating valve 91 and permits the spring 97 to move the valve to the position shown in Figure 6, in which the control conduit 98 from the left-hand end of the control valve 92 is again connected to the return conduit 13 to the sump. This permits control valve 92 to be moved to the left by means of coil spring 104 to again reverse the direction of movement of the piston assembly by connecting the right-hand end of the low pressure cylinder 63 to the low pressure supply conduit 12 and the left-hand end to the return conduit 13.

It will thus be seen that the piston assembly of the hydraulic intensifier 14 is automatically reversed at each end of its stroke to continuously furnish high pressure fluid alternately from the high pressure cylinders 64 and 66 to the high pressure conduit 16. This high pressure fluid is supplied to the accumulator 21 to move the piston 22 thereof until the air pressure in the left-hand end of the accumulator balances the high pressure in the conduit 16. A supply of high pressure fluid is thus available for immediate use by the power brake 17, power steering mechanism 18, or any of the other hydraulically actuated components 19. The hydraulic intensifier 14 automatically stops when the pressure in the high pressure conduit 16 builds up to an equilibrium value dependent of course upon the ratio between the areas of the low and high pressure pistons. In other words, when the area of the high pressure piston 67 or 68 multiplied by the pressure in the high pressure cylinder 64 or 66 equals the effective area of the low pressure piston 69 multiplied by the pressure in the low pressure cylinder 63 a state of hydraulic balance is reached and the piston movement stops. Whenever the pressure in the high pressure conduit 16 drops below this value the intensifier automatically commences reciprocation to restore the pressure. A conventional relief valve (not shown) may be incorporated in the pump 11 to bypass fluid to the pump when necessary, as for example when the intensifier is stopped by the pressure balance.

It will be understood that the invention is not to be limited to the exact construction shown and described, but that various changes and modifications may be made without departing from the spirit and scope of the invention, as defined in the appended claims.

What is claimed is:

1. In a hydraulic intensifier, a housing, a two diameter cylinder having a large diameter central portion and smaller diameter end portions arranged coaxially therewith, a piston assembly comprising a large diameter low pressure piston movable within said central portion and high pressure pistons reciprocable within said end portions, a first control valve means for selectively directing fluid from a low pressure source to one end or the other of said cylinder central portion, said first control valve means including spring means normally acting to maintain said valve means in condition to effect communication between said low pressure fluid source and said one end, control conduit means connecting said first control valve means to said low pressure source, and a second control valve means operable by said piston assembly as the latter reaches the end of its stroke in one direction to direct low pressure fluid through said control conduit means to said first control valve means to shift the latter against the resistance of said spring means into condition to direct low pressure fluid to the other end of said cylinder central portion, thereby to reverse the direction of travel of said piston assembly.

2. In a hydraulic intensifier, a housing, a two diameter cylinder having a large diameter central portion and smaller diameter end portions arranged coaxially therewith, a piston assembly comprising a large diameter low pressure piston movable within said central portion and high pressure pistons reciprocable within said end portions, a control valve means for selectively directing fluid from a low pressure source to one end or the other of said cylinder central portion, said control valve means including spring means normally acting to maintain the same in condition to effect communication between said low pressure fluid source and said one end, control conduit means connecting said control valve means to said low pressure source, an actuating valve means contained in said control conduit means, and pilot valve means operable by said piston assembly at one end of the stroke thereof to operate said actuating valve means to direct low pressure fluid through said conduit means to said control valve means to shift the latter against the resistance of said spring means, said control valve means when shifted being effective to direct low pressure fluid to the other end of said cylinder central portion, thereby to reverse the direction of movement of said piston assembly.

3. In a hydraulic intensifier, a housing, a two diameter cylinder having a large diameter central portion and smaller diameter end portions arranged coaxially therewith, a piston assembly comprising a large diameter low pressure piston movable within said central portion and high pressure pistons reciprocable within said end portions, a control valve means for selectively directing fluid from a low pressure source to one end or the other of said cylinder central portion, said control valve means including spring means normally acting to maintain the same in condition to effect communication between said low pressure fluid source and said one end, control conduit means connecting said control valve means to said low pressure source, an actuating valve means contained in said control conduit means, and pilot valve means located at each end of said cylinder, one of said pilot valve means being operable by said piston assembly at one end of the stroke thereof to operate said actuating valve means to direct low pressure fluid through said conduit means to said control valve means to shift the latter against the resistance of said spring means, said control valve means when shifted being effective to direct low pressure fluid to the other end of said cylinder central portion, thereby to reverse the direction of movement of said piston assembly, the other of said pilot valves being operable by said piston assembly at the other end of the stroke thereof to open said conduit means to a discharge sump whereby said spring means is again effective to shift said control valve means to direct low pressure fluid to said one end of said cylinder central portion.

4. In a hydraulic intensifier, a housing, a two diameter cylinder having a large diameter central portion and smaller diameter end portions arranged coaxially therewith, a piston assembly comprising a large diameter low pressure piston reciprocable within the low pressure cylinder and a pair of oppositely extending interconnected high pressure pistons reciprocable within the end portions of said cylinder, and having a limited stroke, a control valve reciprocable within said housing, spring means urging said control valve toward one end of its stroke, a source of low pressure fluid communicating with said control valve, a sump communicating with said control valve, an actuating valve reciprocably mounted within said housing, a spring urging said actuating valve in one direction, a control conduit between said actuating valve and the end of said control valve opposite the control valve spring, a pair of pilot valves in said housing adapted to be unseated by the large diameter low pressure piston at the opposite ends of its stroke, a conduit from said low pressure source to one end of said actuating valve, one of said pilot valves being incorporated in said last mentioned conduit and arranged when engaged by said low pressure piston to open said conduit and supply low pressure fluid to said actuating valve to actuate the latter against the actuating valve spring to supply low pressure fluid to the said end of the control valve to move the latter throughout its complete stroke, and a second control conduit between said first control conduit and said sump, said second control conduit incorporating said second pilot valve and arranged when said second pilot valve is opened by said low pressure piston to connect said first control conduit to the sump to permit actuation of said actuating valve by said actuating valve spring and sequentially actuation of said control valve by said control valve spring to move the latter throughout its full stroke in the opposite direction.

References Cited in the file of this patent

UNITED STATES PATENTS

| | | |
|---|---|---|
| 2,336,446 | Tucker et al. | Dec. 7, 1943 |
| 2,347,379 | Teeter | Apr. 25, 1944 |
| 2,448,467 | Rockwell | Aug. 31, 1948 |
| 2,573,993 | Sedgwick | Nov. 6, 1951 |

FOREIGN PATENTS

| | | |
|---|---|---|
| 493,556 | France | Oct. 13, 1919 |